United States Patent
Osawa et al.

(10) Patent No.: US 6,870,605 B2
(45) Date of Patent: Mar. 22, 2005

(54) METHOD OF MEASURING LENGTH AND COORDINATES USING LASER TRACKING INTERFEROMETRIC LENGTH MEASURING INSTRUMENTS

(75) Inventors: Sonko Osawa, Tsukuba (JP); Toshiyuki Takatsuji, Tsukuba (JP); Tomizo Kurosawa, Tsukuba (JP); Hironori Noguchi, Tsukuba (JP); Jiang Hong, Tsukuba (JP)

(73) Assignee: Agency of Industrial Science and Technology, Ministry of International Trade and Industry, Tokyo (JP)

( * ) Notice: Subject to any disclaimer, the term of this patent is extended or adjusted under 35 U.S.C. 154(b) by 237 days.

(21) Appl. No.: 10/391,009

(22) Filed: Mar. 19, 2003

(65) Prior Publication Data

US 2003/0179362 A1 Sep. 25, 2003

Related U.S. Application Data

(62) Division of application No. 09/749,950, filed on Dec. 29, 2000, now Pat. No. 6,563,569.

(30) Foreign Application Priority Data

Sep. 25, 2000 (JP) ..................................... 2000-289812

(51) Int. Cl.[7] ........................... G01C 3/08; G01B 11/02
(52) U.S. Cl. ..................................... 356/4.09; 359/496
(58) Field of Search .............................. 356/4.09, 498, 356/496

(56) References Cited

U.S. PATENT DOCUMENTS

| | | | | |
|---|---|---|---|---|
| 4,457,625 A | * | 7/1984 | Greenleaf et al. | 356/511 |
| 4,707,129 A | * | 11/1987 | Hashimoto et al. | 356/4.09 |
| 4,714,339 A | * | 12/1987 | Lau et al. | 356/4.09 |
| 4,790,651 A | | 12/1988 | Brown et al. | 250/203.6 |
| 5,092,898 A | | 3/1992 | Bekki et al. | 623/22.16 |
| 5,920,394 A | * | 7/1999 | Gelbart et al. | 356/615 |

FOREIGN PATENT DOCUMENTS

| | | |
|---|---|---|
| JP | 2795612 | 6/1998 |
| JP | 2795613 | 6/1998 |

* cited by examiner

*Primary Examiner*—David V. Bruce
*Assistant Examiner*—Krystyna Suchecki
(74) *Attorney, Agent, or Firm*—Oblon, Spivak, McClelland, Maier & Neustadt, P.C.

(57) ABSTRACT

A laser tracking interferometric length measuring instrument has a laser source and a tracking articulating optical lever provided on an optical path of an interferometric optical system. To track a retroreflector, the optical lever reflects a laser beam at the retroreflector, which reflects the beam back to the optical lever. This beam is reflected onto a quadrant photodiode. An attitude control means is used to control the attitude of the optical lever so that the laser beam reflected by the optical lever falls on the neutral point of the photodiode.

1 Claim, 6 Drawing Sheets

METHOD OF MEASURING LENGTH AND COORDINATES USING LASER TRACKING INTERFEROMETRIC LENGTH MEASURING INSTRUMENTS

CROSS REFERENCE TO RELATED APPLICATIONS

This application is a divisional application of and claims priority to Ser. No. 09/749,950 filed Dec. 29, 2000 now U.S. Pat. No. 6,563,569, and claims priority to the Japanese Application no. 2000-289812, filed Sep. 25, 2000. The entire contents of the parent application is incorporated herein by reference.

BACKGROUND OF THE INVENTION

1. Field of the Invention

The present invention relates to a laser tracking interferometric length measuring instrument that uses a laser beam to track the traveling distance of retroreflectors traveling in X, Y, Z three-dimensional space while performing trilateration, and to a method of measuring length and coordinates using the length measuring instrument.

2. Description of the Prior Art

There are known measuring instruments using optical interferometry. These instruments were developed for triangulation applications, and incorporate an optical interferometry system in the lens-barrel of the instrument's telescope to measure the traveling distance of mirrors. This technology is used in construction engineering works and other areas of industry that employ the triangulation method, with laser interferometry being used for the measurements that were formerly performed using a tape measure, because optical interferometry provides a higher measurement accuracy than tape measures.

Measurement objects include large-scale coordinate measuring machines, industrial robots, aircraft and other large structures, and general triangulation objects. In recent years, coordinate measuring machines have made dramatic improvements in accuracy, with some systems being capable of measuring length to an accuracy in the order of 1 μm per meter In endeavoring to construct this type of accuracy in a coordinate measuring machine, it is said to be desirable for the gage used to have an accuracy that is one-fifth to one-tenth that of the instrument being calibrated. Therefore, if the accuracy of a coordinate measuring machine is 1 μm, a gage with an accuracy that is one-fifth to one-tenth μm is desirable. However, with the existing level of technology, there is no gage having that kind of precision. Moreover, large-sized coordinate measuring machines have appeared that have a measurement volume capability of 10 meters cubed, within which the measurement accuracy is in the order of a few tens of micrometers.

As described above, it is generally desirable for a calibration gage to be calibrated to an accuracy of one-fifth to one-tenth the accuracy of the machine being calibrated. Interferometric measurement using a frequency-stabilized He—Ne laser is a method suited to measurement of such a calibration gage, but it entails many problems that still need to be resolved.

With respect to the accuracy of single-axis measurement of a coordinate measuring machine along the X axis, Y axis and Z axis, interferometric measurement using the He—Ne laser is possible, but the coordinate measurement resulting from the X, Y, Z travel gives rise to an anti-Abbe's error from the perpendicularity between the three axes and the yawing and pitching. Measuring all error takes far too long to be practical.

Figure 8:
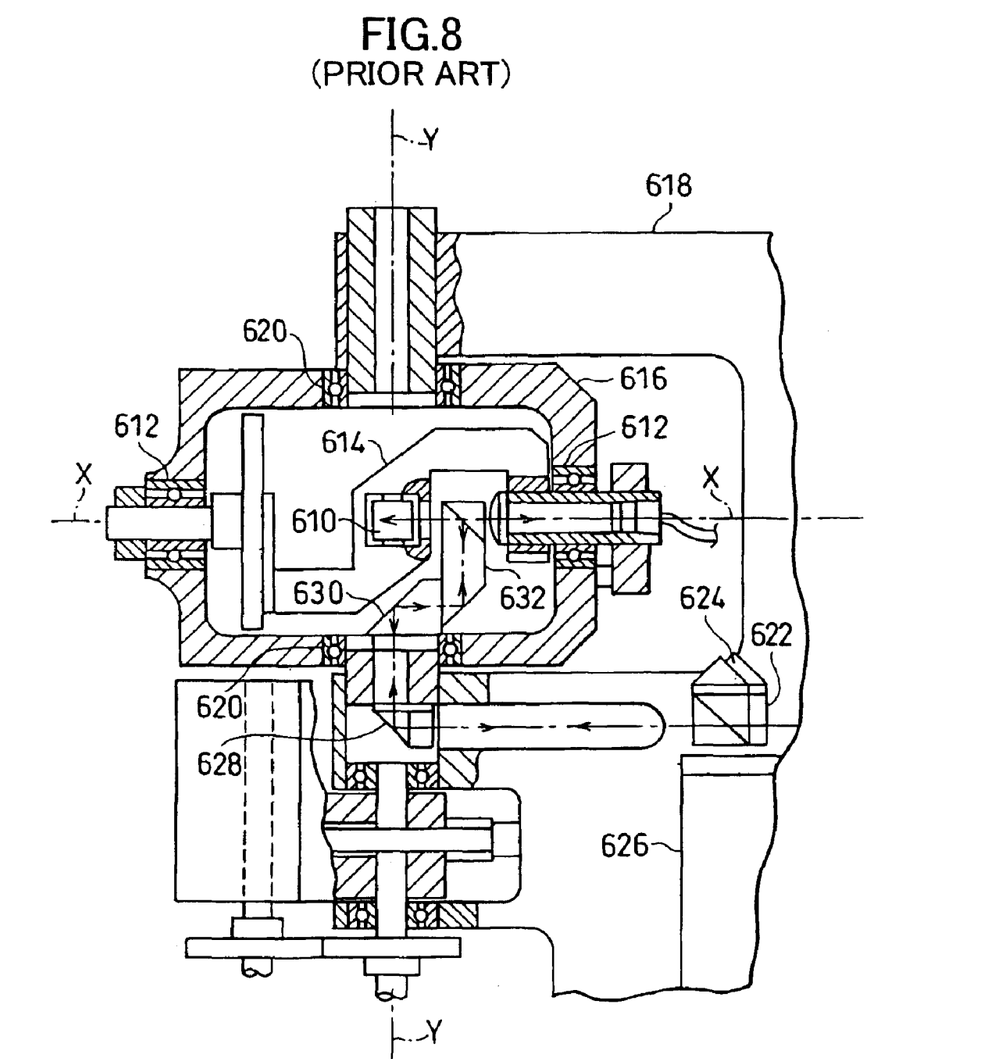
FIG. 8 is a front view drawing of a prior art laser tracking interferometric length measuring instrument.

The prior art includes laser tracking interferometric length measuring instruments for aiming a laser beam at a moving object. FIG. 8 shows an example of such an instrument (JP-A-HEI 7-332922 and 7-332923). In this laser interferometric length measuring instrument, a mirror 610 can be rotated around the X axis and the Y axis by rotators 614 and 616, so the laser beam can be projected onto a retroreflector (not shown) attached onto a moving object. That is, the rotator 614 that supports the mirror 610 is rotatably supported by bearings 612, thereby allowing the rotator 614 to rotate freely around the X axis, relative to the rotator 616, while the rotator 616 is rotatably supported by bearings 620, enabling the rotator 616 to rotate freely around the Y axis, relative to a base plate 618.

The laser beam emitted by a laser source (not shown) is split by a polarizing cube beamsplitter 622 affixed to the base plate 618, with one of the split beams falling incident on a retroreflector 624 such as a corner cube prism or cat's eye, whereby the beam is reflected as a reference beam, and passes via the polarizing cube beamsplitter 622 and falls incident on a detector 622. The other laser beam is reflected along the Y axis by a prism 628, and then along the X axis by prisms 630 and 632, to thereby fall incident on the mirror 610.

Thus, the laser beam reflected by the mirror 610 is rotated when the rotator 616 rotates about the Y axis, and is moved vertically when the rotator 614 rotates about the X axis. This makes it possible to direct the laser beam at a retroreflector attached onto a moving object by controlling the rotation of the rotators 614 and 616. Because of the factors mentioned above, it is preferable for origin of measurement eccentricity arising from the rotation not to exceed 1.0 μm. However, with the configuration of a prior art measuring instrument, keeping the eccentricity to not more than 1.0 μm is difficult. The reasons for this can be explained with reference to the arrangement of FIGS. 8 and 9, as follows.

Figure 9:
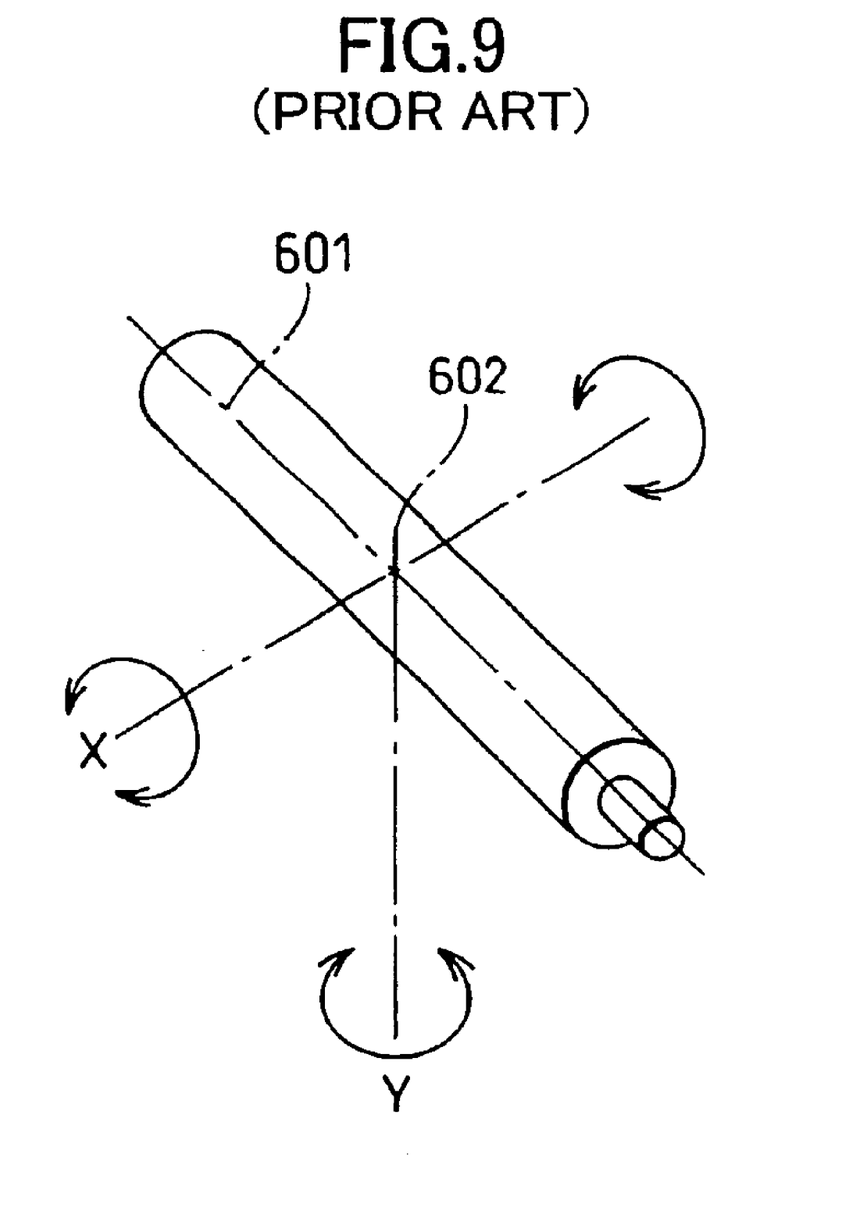
FIG. 9 is a drawing for explaining the point at which three axes intersect one another in the prior art laser tracking interferometric length measuring instrument of FIG. 8.

1. The axis 601 of the laser beam reflected by the mirror 610 is an imaginary axis of a cylinder having a certain sectional area, so mechanical contact is not possible.
2. It is difficult to have the three axes comprised by the X-Y two-axis rotation center 602 of the gimbal mount and the laser beam axis 601 intersect with one another at one point.

As the interferometric origin of measurement, there should be no movement at the point at which the three axes intersect one another. If the attitude of the telescope is changed by error at the point of intersection of the three axes, the approximate 3-axis intersection point will move eccentrically, giving rise to a primary error in the length measurement.

An object of the present invention is to provide a laser tracking interferometric length measuring instrument and method that enable eccentricity arising from rotation of the origin of interferometric measurement to be kept to not more than 1.0 μm, even when a change in the attitude of the laser beam axis results in displacement of the origin of interferometric measurement, that is, a slight movement of the center of the reflector of an articulating optical lever.

Another object of the invention is to provide a method of measuring coordinates that can utilize the calibration of a large-sized coordinate measuring machine having a measurement volume capability of 10 meters cubed.

A further object of the invention is to provide a laser interferometric length measuring method that can utilize the calibration of a high-accuracy coordinate measuring machine capable of measuring length to an accuracy in the order of 0.1 μm per meter.

SUMMARY OF THE INVENTION

To attain the above object, the present invention provides a laser tracking interferometric length measuring instrument comprising: a laser source; a tracking articulating optical lever provided on an optical path of an interferometric optical system, the articulating optical lever reflecting an incident laser beam from the laser source to a retroreflector that is a measurement object, the beam being reflected by the retroreflector to fall incident on the optical lever; a quadrant photodiode having a neutral point on which falls incident a reflected beam from the articulating optical lever; and attitude control means for controlling an attitude of the articulating optical lever to position a reflected laser beam from the optical lever on the neutral point of the photodiode.

The above object is also attained by the laser tracking interferometric length measuring instrument according to claim 1, wherein the articulating optical lever comprises: a hemisphere with a mirror surface; a ball stylus one end of which is connected to a spherical surface portion of the hemisphere via a connecting rod, and another end of which is fixed to a table that can be moved along X and Y axes; and a three-ball seat into which the spherical surface portion of the hemisphere is urged.

The above object is also attained by a laser tracking interferometric length measuring method comprising: directing a laser beam from a laser source to fall incident on a center of an articulating optical lever reflector provided on an optical path of an interferometric optical system; projecting the laser beam reflected from the optical lever onto a retroreflector with the reflector to have the reflected laser beam from the retroreflector received at the reflector center.

The above object is also attained by the laser interferometric length measuring method which includes using the reflector to guide the laser beam reflected by the retroreflector to a quadrant photodiode, using an electrical output from the photodiode as input to a control apparatus, and controlling an attitude of the reflector to position a neutral point of the photodiode output in the X and Y directions at a point of maximum beam intensity.

The above object is also attained by a method of measuring coordinates comprising: using four laser tracking interferometric length measuring instruments to measure a position of a retroreflector that is a measurement object a prescribed number of times to determine the mutual arrangement of the laser interferometric length measuring instruments and the position of the retroreflector.

As described in the above, in the laser interferometric length measuring instrument according to the present invention, a laser beam is directed at the center of the reflector of an articulating optical lever provided on the optical path of the laser interferometric optical system. The reflected laser beam can be directed in a desired direction by controlling the optical lever. While controlling the optical lever to have the reflected laser beam track a retroreflector that is the measurement object, displacement of the interferometric origin of measurement can be kept very small, even if the attitude of the optical axis is changed. By using an articulating optical lever having a hemisphere with a sphericity of 0.1 μm and an R-H of 0.1 μm, origin of measurement based eccentricity can be kept to a maximum of 1.0 μm.

Moreover, because the laser tracking interferometric length measuring method of the invention uses just length measurement to determine coordinates, measurement accuracy is not affected by any increase in the size of the measurement volume. The method of measuring coordinates according to the present invention can therefore be used to calibrate the type of large-sized coordinate measuring machines described above.

In addition, with respect to measurement accuracy, a prior art coordinate measuring machine can be calibrated interferometrically using a He—Ne laser, but it requires much time. In contrast, in accordance with the present invention, X, Y, Z indicated values can be readily calibrated by tracking a retroreflector attached to the end of the Z axis of a coordinate measuring machine, and perpendicularity values also can be measured.

Further features of the invention, its nature and various advantages will be more apparent from the accompanying drawings and following detailed description of the invention.

DESCRIPTION OF THE PREFERRED EMBODIMENT

Figure 1:
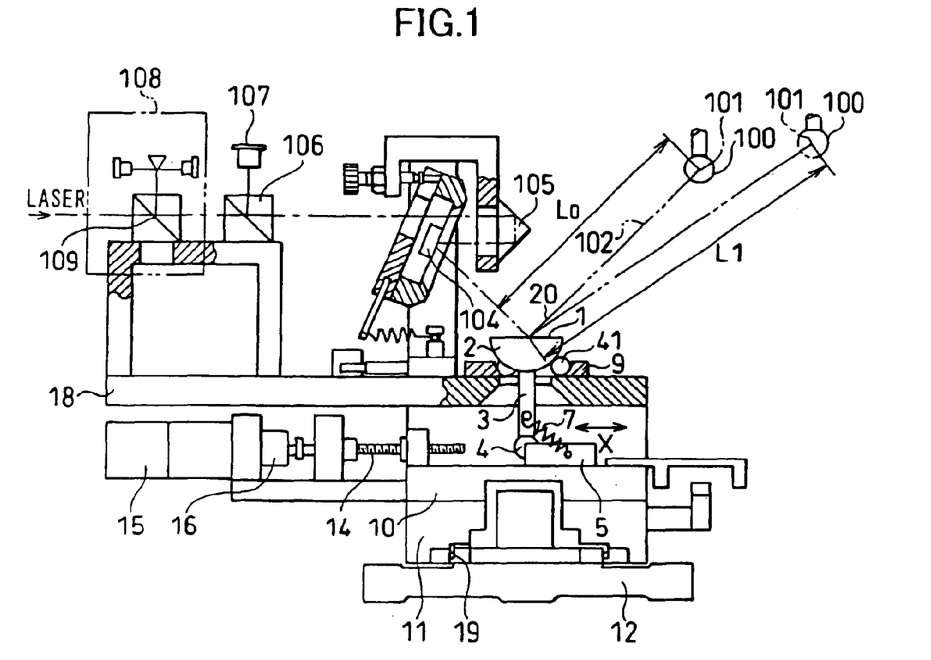
FIG. 1 is a drawing showing a partially cross-sectional front view of an embodiment of the laser interferometric length measuring instrument of the present invention.
Figure 2:
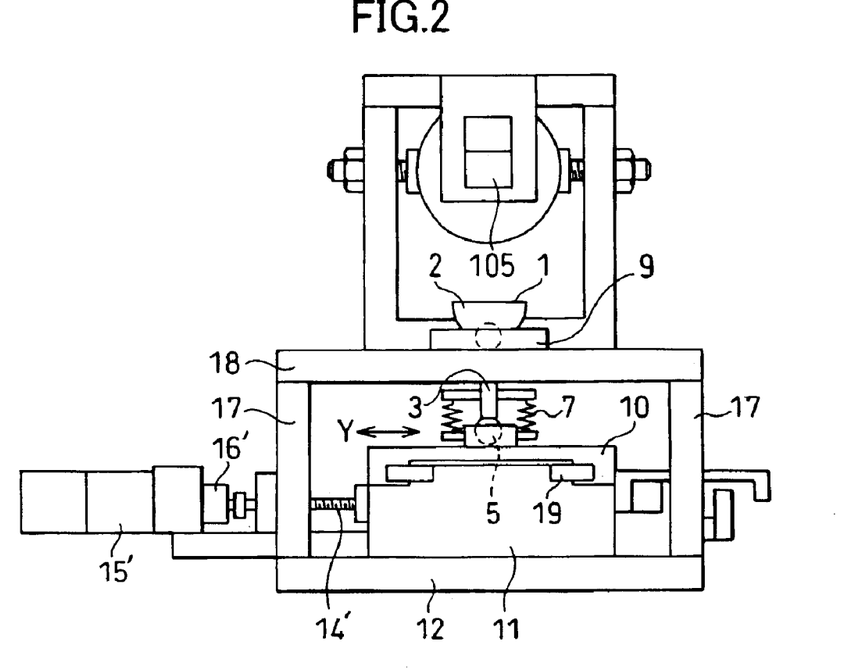
FIG. 2 is a side view drawing showing the laser interferometric length measuring instrument of FIG. 1 from the right side.

FIGS. 1 and 2 show a laser tracking interferometric length measuring instrument according to an embodiment of the present invention. Reference numeral 1 denotes the basic structure of an articulating optical lever used in the above length measuring instrument, which also includes a hemisphere 2, a three-ball seat plate 9 and a ball 4, details of which are shown in FIGS. 3, 4 and 5.

Figure 3:
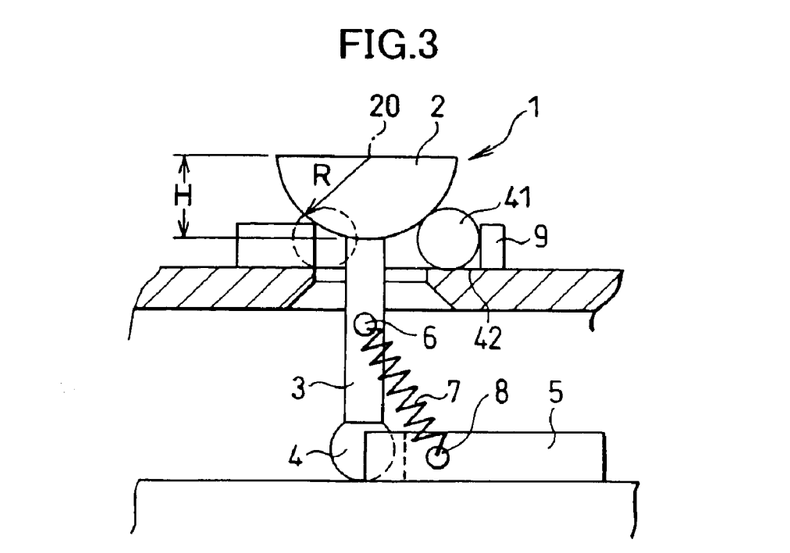
FIG. 3 is a front view drawing of an articulating optical lever of the laser interferometric length measuring instrument of FIG. 1.
Figure 4:
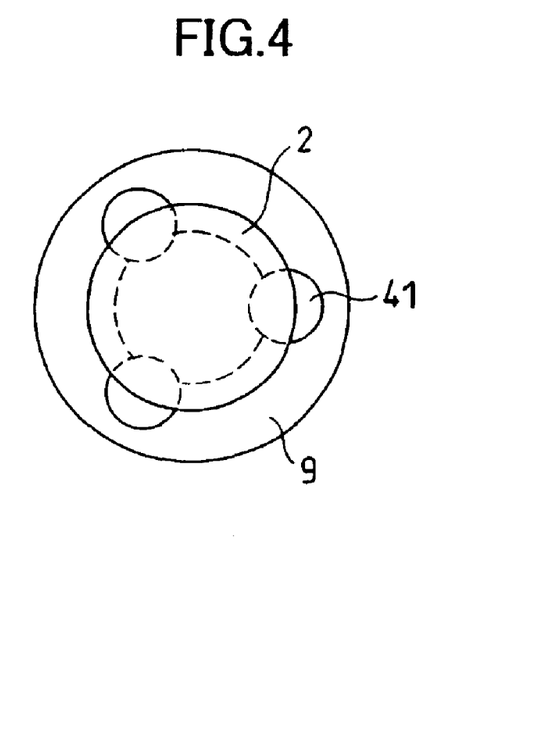
FIG. 4 is a plan view drawing of the three-ball seating of the articulating optical lever of FIG. 3.
Figure 5:
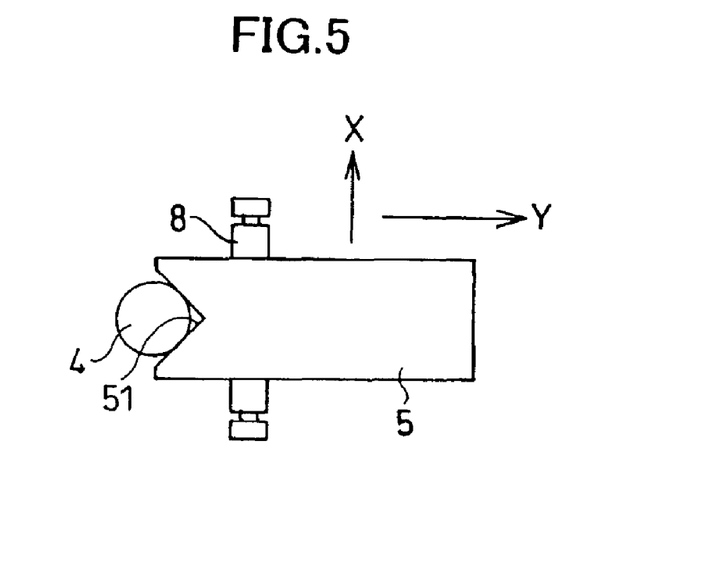
FIG. 5 is a plan view drawing of the contact between the ball stylus of the articulating optical lever of FIG. 3 and a V-shaped surface.

In FIGS. 3 and 4, the hemisphere 2 was prepared by cutting a steel bearing ball in half plus a slight allowance for finishing, and the cut surface was lapped to give the hemisphere a thickness H equal to the radius R. As the hemisphere 2, there may be used a glass hemisphere finished in the same way as a steel one. Each steel ball-bearing ball that was actually selected had a sphericity that was within 0.1 μm, and was cut to form a hemisphere which was lapped to an R-H value of 0.1 μm. The sphericity of 0.1 μm plus the R-H value of 0.1 μm is 0.2 μm, so when the hemisphere is set in place on a three-ball seat and swung, the eccentricity of the ball center is within the target 1.0 μm, making it possible for the origin of measurement to reach the target.

The ball 4 is integrally connected to the bottom of the hemisphere 2 by a connecting rod 3 (FIG. 3). The three-ball seat plate 9 has three holes 42, one every 120 degrees. A steel ball 41 is press-fitted into each hole. Together, the three-ball seat plate 9 and the balls 41 constitute a three ball seat (FIG. 4). The three-ball seat plate 9 is affixed to a top-plate 18 attached to a stand 17 set on a baseplate 12. This ensured that the three-ball seat plate 9 will not move except for the influence of thermal expansion or vibration. The balls 41 are fixed in the holes 42, unable to make even the smallest movement.

The curved surface portion of the hemisphere 2 of the optical lever 1 sits on the three-ball seat, and the ball 4 is in contact with a V-shaped surface 51 of a V-plate 5 affixed to the top of an X-motion table 10. A pair of tension springs 7 are attached to the connecting rod 3 and to pins 6 and 8 on the V-plate 5. Under the force of the tension springs 7, the hemisphere 2 is urged into contact with the three steel balls 41 of the three-ball seat, and the ball 4 is urged into contact with the V-shaped surface 51. The same effect can be obtained using magnetic force instead of the tension springs 7.

With respect to FIGS. 1 and 2, the X-motion table 10 can be moved in the X direction by motor 15, via coupling 16 and feed-screw 14. Similarly, the Y-motion table 10 can be moved in the Y direction by motor 15', via coupling 16' and feed-screw 14'. The Y-motion system is attached to baseplate 12 by guideway 19. The motors 15 and 15' can be pulse motors, servo motors or linear motors or the like. If linear motors are used, the feed-screws 14 and 14' can be omitted.

Figure 6:
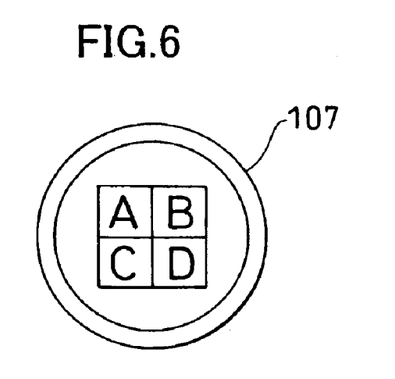
FIG. 6 is a plan view drawing of a quadrant photodiode used in the laser interferometric length measuring instrument of FIG. 1.

Reference numeral 100 denotes a retroreflector used as an object needed for coordinate measurement. A parallel beam 102 projected at the center 101 of the retroreflector 100 and reflected from the point of incidence returns back along the same line to its original position. In FIG. 1, the two-dash lines denote the laser beam. From the retroreflector 100, the returning beam is reflected at the center 20 of the top surface of the hemisphere 2 and is thereby deflected to beamsplitter 106 via mirror 104 and right-angle prism 105. There, roughly half of the returning beam is reflected onto a quadrant photodiode 107. As shown by FIG. 6, the quadrant photodiode 107 has four light-receiving surfaces A, B, C, and D.

The quadrant photodiode 107 is arranged with the neutral position adjusted so that when the retroreflector 100 is stationary, electrical outputs a, b, c, d from the receiving surfaces A, B, C, D of the quadrant photodiode 107 are all equal. This balance between the outputs a, b, c, d is destroyed when the retroreflector 100 moves. With respect to these outputs, the position of the retroreflector 100 can be tracked by effecting position control along the X axis in which, taking the value of [a+c]−[b+d] as deviation, the target is [a+c]−[b+d]=0, and by effecting Y-axis control in which, taking the value of [a+b]−[c+d] as deviation, the target is [a+b]−[c+d]=0.

The portion 108 shown enclosed by a one-dash line in FIG. 1 is an interferometer configuration for measuring length. The length of the optical path from the center 109 of the interferometer 108 to the center 20 of the top surface of the articulating optical lever 1 is a constant length. This means that measuring the length of the optical path from the interferometer center 109 to the center 101 of a retroreflector 100 makes it possible to interferometrically measure the value of $L_1-L_0$, which is the length differential between retroreflector center 101 and optical lever top-surface center 20 resulting from the movement of the retroreflector 100.

Figure 7:
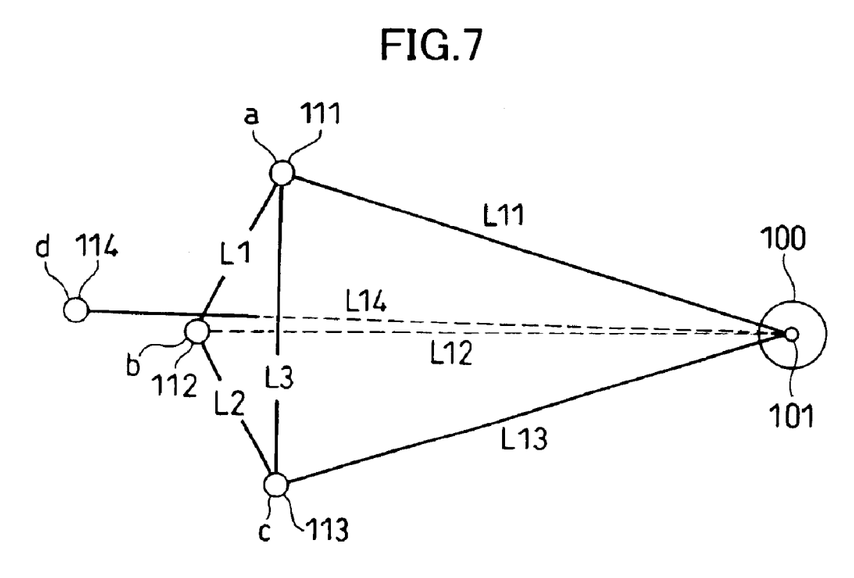
FIG. 7 is a drawing for trilateration or quadrilateration using three or four laser interferometric length measuring instruments according to the present invention.

FIG. 7 illustrates a trilateration method using the above measuring unit. Measuring units (the measuring unit of FIG. 1) 111, 112 and 113 are positioned at a, b and c, respectively, and a retroreflector 100 is placed at a position to which length measurement is to be applied. The lengths $L_{11}$, $L_{12}$ and $L_{13}$ from the measuring units 111, 112 and 113 to the center 101 of the retroreflector 100 are measured. By measuring the mutual positional arrangement of the measuring units 111, 112 and 113 beforehand, based on the principle of trilateration, the center position of the refroreflector 100 is determined uniquely from the lengths $L_{11}$, $L_{12}$ and $L_{13}$.

However, it is very difficult to measure the mutual positional arrangement of the measuring units to within an accuracy of 1 μm. Moreover, when employing laser interferometers using incremental counters for the measuring units, it is possible to measure only the traveling distance of the retroreflector; it is not possible to measure the absolute length from measuring unit to retroreflector. In such a case, the self-calibration described below can be used to determine the mutual arrangement among the measuring units and the absolute length from measuring unit to retroreflector at the start of the measurement. Therefore, based on the trilateration principle, the position of the retroreflector center can be determined.

The above-mentioned self-calibration will now be explained. To implement the self-calibration, in addition to the three measuring units 111, 112 and 113, a fourth measuring unit 114 is used, located at d. In this case, the mutual arrangement among the measuring units, and the distances from each measuring unit to the center of the retroreflector can be unknowns. Next, the retroreflector 100 is moved to an arbitrary position and the laser interferometer counter that each measuring unit is equipped with is zeroed. The retroreflector 100 is then moved to another arbitrary position, and measurements are conducted using the laser interferometer of each measuring unit. In this way, four measurement values at the measuring position of each of the four measuring units at that point are obtained. By repeating the process of moving the retroreflector 100 to other places and performing measurements, after n moves, a total of 4×n measurement values can be obtained.

For the person doing the measuring, the coordinates of each measurement point at this time are unknown variables. Since these are three-dimensional coordinates, there are three unknown variables. Since the above measurements are conducted n times, the total number of unknown variables is 3×n. Moreover, there are six unknown variables relating to the arrangement of the measuring units and three unknown variables relating to the initial position of the retroreflector. Thus, in all, there are 3×n+6+3 unknown variables. There are 4×n measurement values, so if the two numbers are the same, that is, 3×n+6+3=4×n, so n=9, so that mathematically unique solutions for all the unknown variables can be determined by conducting measurements at nine points. This is the self-calibration principle. In accordance with this method, if the arrangement of the measuring units and the initial length to the retroreflector can be determined, even when the retroreflector is subsequently moved to an arbitrary point, based on the trilateration principle, it is possible to determine the position of the retroreflector from the measurement values obtained by each measuring unit's laser interferometer. Moreover, when more than nine measurement points can be utilized in the calculation for determining the unknown variables, the equation becomes over-constrained, making it impossible to achieve a solution, in which case the least squares method may be used for the determination.

In accordance with the present invention, a laser tracking interferometric length measuring instrument is obtained by providing an articulating optical lever on the optical path of an optical interferometry system and projecting a laser beam at the center of the optical lever reflector. The reflected beam can be directed in a desired direction by controlling the articulating optical lever. Thus, by controlling the articulating optical lever, the reflected beam can be made to track a retroreflector constituting a measurement object, whereby even if there is a change in the attitude of the optical axis, displacement of the origin of interferometric measurement can be kept very small.

Also, the articulating optical lever has a hemisphere with a top surface that is a mirror surface, and a ball stylus that is connected to the hemisphere by a connecting rod. The curved surface part of the hemisphere is urged onto a three-ball seat and the ball stylus is urged onto a V-shaped surface of a V-plate fixed to a moving table. This arrangement makes it possible to obtain a measurement reference origin that has very little eccentricity. By using an articulating optical lever with a hemisphere having a sphericity of 0.1 μm and an R-H of 0.1 μm, origin of measurement based eccentricity can be kept to within 1.0 μm.

In addition to the beamsplitter used for the interferometry, there is another beamsplitter provided on the path of the returning beam that guides roughly half of the returning beam to a quadrant photodiode, which outputs an electrical signal that is input to a control apparatus to control the attitude of the reflector so that the neutral point of the photodiode output in the X and Y directions is positioned at the point at which the beam is at maximum intensity. Specifically, the control apparatus moves the table, moving the V-shaped surface, controlling the attitude of the articulating optical lever to thereby track the position of the retroreflector.

By using four laser tracking interferometric length measuring instruments according to the present invention to track the position of a retroreflector as the object, the position of the retroreflector can be determined even when the mutual arrangement of the laser tracking interferometric length measuring instruments and the distance from the instruments to the retroreflector cannot be measured.

The positioning error of industrial robots can be found by tracking retroreflectors affixed to the ends of the robots' operating axes. Once a robot's positioning error is known, the positioning programming can be done off-site, eliminating the need to carry out on-site program correction, which is what is now done. This will make it possible to save a considerable amount of time.

Furthermore, calibration of a high-accuracy or large-sized coordinate measuring machine can be accomplished by attaching a retroreflector to the end of the machine's Z axis and using the motion functions employed in coordinate measurement to move the retroreflector. Then, the machine's length measuring system and the trilateration-based length measuring system of the laser interferometric length measuring instrument of the invention can be used to obtain the traveling distance, and the difference between the two measured values can be used to obtain the calibration value to use in calibrating the machine, resulting in accurate calibration.

What is claimed is:

1. A method of measuring coordinates, comprising:

disposing a first articulating optical lever including a hemisphere having an upper surface that is an optical reflecting surface, a connecting rod connected to a lower surface of the hemisphere, a ball provided on a distal end of the connecting rod, a three-ball seat for seating a curved surface portion of the hemisphere thereon under pressure, a V-plate having a V-shaped surface with which the ball is in pressure contact, and a motion table that affixes the V-plate thereto and moves the V-plate along X and Y axes, and disposing three articulating optical levers of a structure identical with that of the first articulating optical lever;

disposing a retroreflector at a position, wherein it is desired to measure a length to said position;

measuring a distance between each of the four articulating optical levers and a center position of the retroreflector;

moving the retroreflector to optional positions;

tracking a distance between each of the four articulating optical levers and a center position of the retroreflector moved to each of the optional positions; and repeating the tracking operation a predetermined number of times to determine mutual positional relationship of the four articulating optical levers and a position of the retroreflector.

* * * * *